June 13, 1972   E. E. FIGGE ET AL   3,669,532
PROJECTOR CONTROL APPARATUS
Filed March 23, 1970
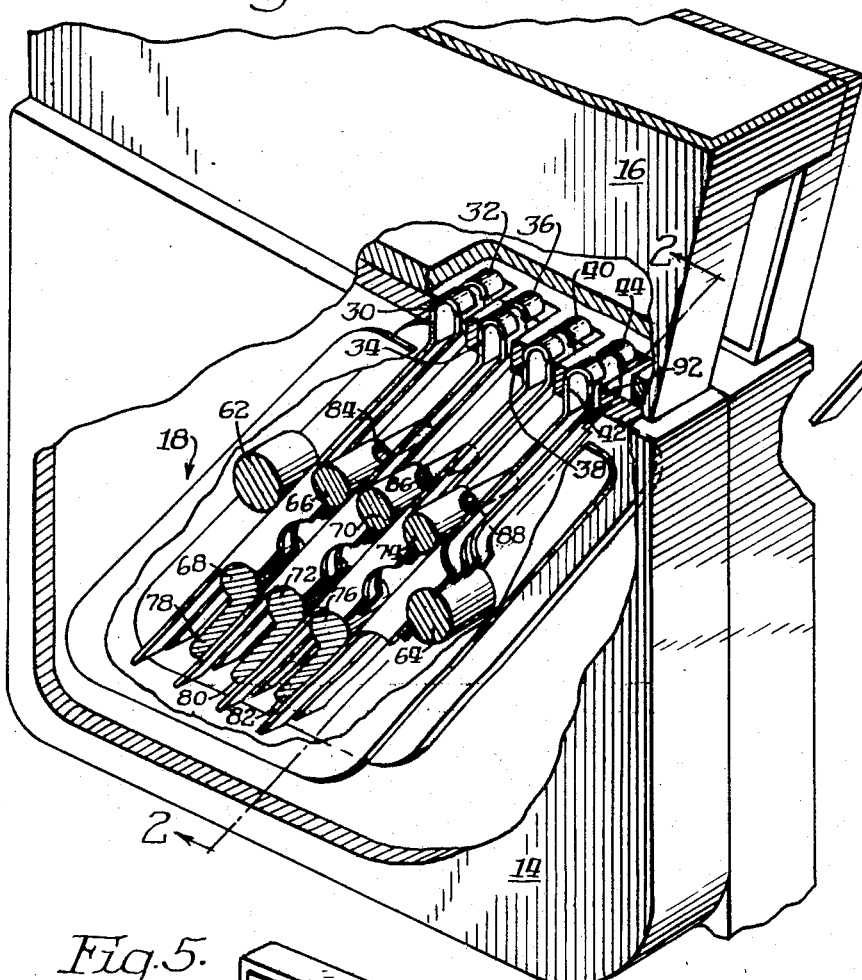
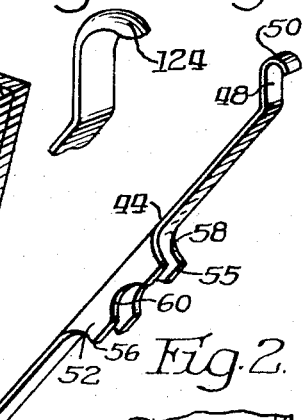
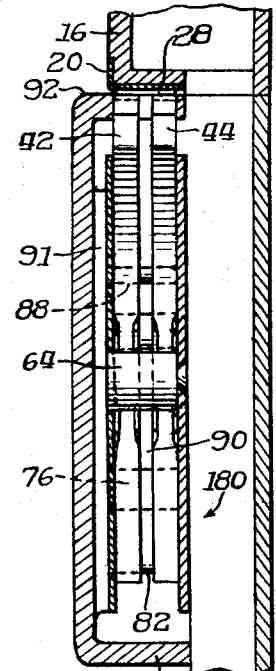
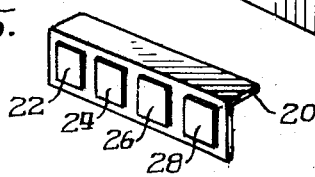
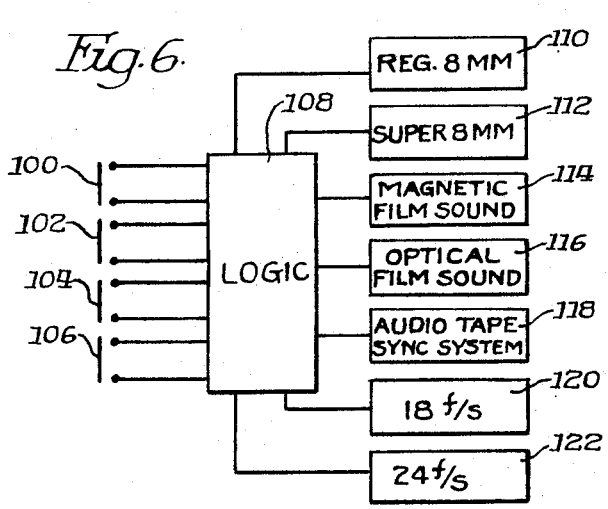
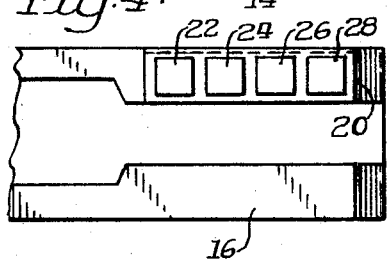
Inventors:
Erwin E. Figge,
Joseph H. Lancor, Jr,
Edward H. Lodge.

United States Patent Office 3,669,532
Patented June 13, 1972

3,669,532
PROJECTOR CONTROL APPARATUS
Erwin E. Figge, Des Plaines, Ill., Joseph H. Lancor, Jr., Arcadia, Calif., and Edward H. Lodge, Wilmette, Ill., assignors to Bell & Howell Company, Chicago, Ill.
Filed Mar. 23, 1970, Ser. No. 21,607
Int. Cl. G03b 23/02
U.S. Cl. 352—78 C
9 Claims

ABSTRACT OF THE DISCLOSURE

A motion picture film projector control apparatus which automatically selects the operational mode of the projector to accommodate the particular film format to be displayed. Upon the outer surface of the lower wall of a film cartridge is placed a label having an electrically conductive surface. The mounting module of the projector, which receives the cartridge, includes parallel electrical contacts. The contacts are aligned for engagement with the conductive surface of the label upon positioning of the cartridge. In this manner, a circuit is completed which serves to actuate predesignated machine functions corresponding to the film format.

---

This invention generally relates to a film projector control apparatus, and more particularly relates to such an apparatus adapted for use with reel enclosed cartridges.

To permit projection of the various film formats presently available, modern moving picture projectors are quite versatile and generally include means for manually controlling various machine functions so as to allow wide selection of the operational mode. For example, a modern projector may include a selector lever by which the operator can select either regular 8 or super 8 mm. film projection. Additionally, the operator is frequently permitted to select alternate film speeds such as 18 or 24 frames per second. The more advanced motion picture projectors also include audio control circuitry facilitating sound accompaniment for the film. Various arrangements are used in providing this sound accompaniment such as an optical film sound track, or a magnetic film sound track. A third arrangement includes an audio accompaniment recorded upon an audio tape. The operation of the film is tied to the tape so that the film and tape are maintained in proper synchronization.

For each roll of film which the operator desires to project, he is required to manipulate the necessary controls thereby selecting the proper operating mode for the projector which corresponds to the film format. This process may require several manual operations for each film selected. In the event a sequence of films is selected having differing formats, the operation of the machine becomes rather cumbersome and awkward. Should the operator erroneously position one of the many operating levers, it is quite possible that he may project several hundred feet before realizing the error. In fact, if he fails to select the proper sound accompaniment, he may believe that there is no sound accompaniment for film which in fact has audio provisions.

It is a particular feature of the illustrated embodiment that the various manual operations made by the operator are automatically and accurately performed upon insertion of a film cartridge into the projector. Thus, it is quite apparent that the operator may readily select a combination of film formats for rapid sequential projection without the necessity of making manual adjustments for each film projected.

A main object of this invention is to provide automatic control apparatus for selecting the operational mode of a moving picture projector which corresponds to the selected film format.

Further, other objects and advantages of this invention will be apparent from the description of the accompanying drawings in which:

FIG. 1 is a sectionalized, fragmentary perspective view of a portion of a motion picture projector including certain features of this invention;

FIG. 2 is a sectional view taken along line 2—2 of FIG. 1;

FIG. 3 is a perspective view of a component of the apparatus illustrated in FIG. 1;

FIG. 4 is a fragmentary bottom view of a component of the apparatus illustrated in FIG. 1;

FIG. 5 is a perspective view of a component of the apparatus illustrated in FIG. 1;

FIG. 6 is a diagrammatic illustration of the control circuitry for the apparatus illustrated in FIG. 1; and FIG. 7 is an enlarged perspective view of an alternate embodiment of a component of the apparatus illustrated in FIG. 1.

With respect to FIG. 1, a portion of a moving picture projector 10 is illustrated, which includes a mounting module 14 adapted to receive a film cartridge 16. The structural characteristics of a mounting module suitable for use with the illustrated embodiment are more particularly described in U.S. patent application No. 817,914 filed Apr. 21, 1969, entitled "Mounting Apparatus for a Web Handling Machine" by Edward R. Prelletz et al., having a common assignee with the instant application. The cartridge 16 carries a film reel therein. A cartridge particularly suitably for use with the illustrated embodiment is described in U.S. patent application Ser. No. 826,045 filed Apr. 21, 1969, entitled "Cartridge" by Gordon E. Bradt et al. and having a common assignee with the intant invention. Although the illustrated embodiment is described in connection with a cartridge, it should be understood that various other film carrying devices may be used without departing from the spirit of this invention.

Supported within the mounting module of the projector is a contact assembly 18. When cartridge 16 is positioned within the module, a label 20 carrying one or more electrically conductive elements in the form of conductive surfaces 22, 24, 26, and 28 is brought into registration with the contact assembly thereby completing an electrical circuit as will be more clearly described hereinafter.

Contact assembly 18 includes four pair of electrical contacts in the form of elongated resilient contact leaves 30, 32, 34, 36, 38, 40, 42, and 44 supported upon a mounting board 46 constructed of suitable insulating material. With particular reference to FIG. 3, leaf 44 is formed from a flat, elongated, metallic stock, one end of which is bent in the form of a hook 48, defining a contact surface 50 at its outwardly disposed curved surface. This particular construction facilitates a contact wiping action as will hereinafter be further described. Approximately midway between the ends of leaf 44 are formed a pair of downwardly projecting flanges 52 and 55 which serve to align the leaf with respect to mounting board 46. The flanges are arcuately cut at their ends as at 56 and 58, and define a curved surface along their outer edge 60. The remaining leaves 30, 32, 34, 36, 38, 40, and 42 are similarly constructed and together with leaf 44 are retained in position upon the mounting board by means of a pair of mounting pins 62 and 64 and alignment studs 66, 68, 70, 72, 74, and 76.

Pin 62 is positioned adjacent the outer surface of parallel leaves 30 and 32, and pin 64 is positioned within the arcuate paths defined by the flange edges of leaves 42 and 44. Studs 66, 70, and 74 are nestled in the upwardly disposed arcuate edges of parallel leaf contacts 30 and 32; 34 and 36; and 38 and 40 respectively. Similarly, as viewed in FIG. 1, studs 68, 72, and 76 are positioned in the lower arcuate edges of their respective parallel leaf combinations. Downwardly projecting from lower studs 68, 72, and 76 are respectively stiffening projections 78, 80, and 82 which serve to increase the stiffness of their associated leaves. Serving to prevent accidental shorting between the parallel sets of leaves, spacer dowels 84, 86, and 88 are positioned above upper studs 66, 70, and 74 respectively. Shorting between the adjacent pairs of parallel contact leaves is prevented by insulating plate 90. The insulating plate is drilled to clear the various pins, dowels and mounting studs which project from mounting board 46. Additionally, a cover plate 91 is mounted upon the pins as illustrated in FIG. 2. The particular arrangement described provides a relatively rigid construction and retains the leaves securely in their proper aligned parallel position within mounting module 14.

As previously mentioned, label 20 secured to the lower wall of cartridge 16 and is positioned with respect to the cartridge so that conductive surfaces 22, 24, 26, and 28 are brought into engagement with the contact surfaces of selected pairs of leaves thus producing a conductive circuit therethrough. For example, when cartridge 16 is in position, the conductive surface 22 will provide a conductive path from leaf 30 to leaf 32. Similarly, the presence of the remaining conductive surfaces will provide a conductive path between the respective pairs of adjacent parallel contact leaves. It has been found that a particularly suitable label may be constructed by bonding copper foil to a surface of a sheet of Mylar, and thereafter applying adhesive to the remaining surface of the sheet so as to enhance its adhesive characteristics. The illustrated label provides space for four separate distinct conductive surfaces. It should be noted that any one, or a combination of these surfaces may be deleted depending upon the format of the film being projected as will be subsequently further related in connection with the discussion of FIG. 6.

As cartridge 16 is positioned upon the projector, the distinct conductive surfaces of the label are brought into contact with their contact leaves. Each of the leaves are positioned so that their hooked ends protruded slightly above upper wall 92 of module 14, assuring adequate contact with the conductive surfaces of label 20. Thus, as the cartridge is placed into position, the leaves are deflected slightly downward as viewed in FIG. 1, causing them to move to the right. The sliding movement of the contact surfaces of the leaves along the conductive surfaces of the label produces a contact wiping action which greatly helps to clean the contacts and minimize the adverse effects of corrosion. This wiping action greatly facilitates maintenance of the contacts and assures an adequate conductive path between the pairs of parallel leaves.

With respect to FIG. 6, a switch 100 is formed by leaves 30, 32, and contact surface 22, and a switch 102 is formed by leaves 34 and 36, and a conductive surface 24. Similarly, switches 104 and 106 are respectively formed by leaves 38 and 40 and conductive surface 26 and leaves 42 and 44 together with conductive surface 28. In the event the particular label selected is provided with a conductive surface as at 22, insertion of the cartridge into mounting module 14 will cause closure of switch 100. Similarly, the presence or absence of a conductive surface at 24, 26, and 28 will respectively determine the operative condition of switches 102, 104, and 106 respectively. The switches are in turn connected to a logic circuit 108 which senses the operative condition of the switches and, in accordance with a predetermined code, actuates the various operation functions of the projector which are indicated by legend blocks 110, 112, 114, 116, 118, 120, and 122. Thus, depending upon the operative condition of switches, logic circuit 108 will actuate either the regular 8 (110) or the super 8 (112) mechanism of the projector. Similarly, in the event the film format includes an audio accompaniment, this condition will be indicated by closure of the appropriate switches. Logic circuit 108 will actuate either the magnetic film sound function of the machine 114, the optical sound function 116, or the audio tape sync system 118. Similarly, the closure of a prearranged contact combination will be sensed by the logic circuit, thus determining whether the 18 frame per second 120 or 24 frame per second 122, operative function of the machine is actuated. It will be appreciated that the various machine operations are described by way of the illustration and not limitation.

In use, it is contemplated that the operator will be supplied with a selection of labels each of which is provided with a predetermined combination of conductive surfaces. The operator will then select the particular label which corresponds to the film format which he has placed within the cartridge and apply the label to the lower wall of the cartridge. In this manner, the cartridge is coded for the particular film contained therein. The operator will then insert the cartridge onto the mounting module of the projector in preparation for viewing. The positioning of the cartridge 16 upon the mounting module 14 automatically causes a closure of the appropriate switches for actuation of the logic circuit. The logic circuitry actuates the appropriate machine operations which correspond to the film format selected. In this manner, the operator may readily select films of varying format, which may then be rapidly inserted into the projector for projection without the necessity of constantly changing the operation of the machine to correspond with the particular film being projected.

FIG. 7 illustrates an alternate construction of a contact leaf. The upwardly disposed end of the leaf is formed in the shape of a spoon as at 124 with the convex portion being disposed toward the film cartridge. This particular configuration provides contact wiping action in a manner similar to that previously described in connection with the embodiment of FIG. 3. Further, distortion of the leaf resulting from accidental movement of the cartridge normal to the plane thereof is minimized. The domed surface of the spoon 124 facilitates sliding movement of the label 20 with respect to the leaf in all directions.

Although but one embodiment of this invention has been illustrated and described, it should be understood that various modifications and variations of the invention may be made without departing from the scope and spirit of the dependent claims.

What is claimed is:

1. An apparatus for controlling the operation of a motion picture projector provided with means for receiving a film cartridge for encasement of a film having a predetermined projection format comprising at least one clearly defined, electrically conductive element carried upon a surface of the film cartridge serving to provide an informational signal to the projector as to the desired operational mode and a thin layer of adhesive sandwiched between the surface of the film cartridge and one surface of said conductive element thereby causing said element to adhere to the surface of the cartridge.

2. The control apparatus of claim 1 which further includes a relatively thin, flat, non-conductive label, said conductive element being disposed upon said label for adherence thereto and said adhesive being applied to said label upon the surface thereof opposite to the surface of said label carrying said conductive element.

3. The control apparatus of claim 1, wherein a plurality of conductive elements are disposed upon a surface of said label, each of said elements serving to provide a distinct informational signal to the projector as to the desired operational mode.

4. The control apparatus of claim 1, wherein the projector includes means for sensing the presence of said conductive element so as to permit the operational mode of the projector to conform to the projection format of the film.

5. The control apparatus of claim 4, wherein said sensing means is in the form of a pair of electrical contacts disposed for registration with said conductive element so that upon orientation of the cartridge with respect to the projector, an electrical circuit is completed between said contacts by said conductive element.

6. The control apparatus of claim 5, wherein said electrical contacts are elongated resilient metallic leaves positioned upon the projector so that the longitudinal axes of each of said leaves intersects the plane containing said conductive element at an acute angle when the cartridge is positioned with respect to the projector thereby providing a contact wiping action upon positioning of the cartridge.

7. The control apparatus of claim 6, wherein a plurality of contact leaves are provided, a plurality of conductive elements positioned for the registration therewith, and a control circuit connected to said contact leaves and connected to various operational functions of the projector whereby the presence of a selected conductive element is sensed by said control circuit which in turn selects the operational mode of the projector corresponding to the film format.

8. The control apparatus of claim 6, wherein the end of each of said leaves positioned adjacent the cartridge is formed in the shape of a hook the convex surface thereof being disposed towards the cartridge.

9. The control apparatus of claim 6, wherein the end of each of said leaves positioned adjacent the cartridge is formed in the shape of a spoon with the convex surface thereof being disposed towards the cartridge.

References Cited

UNITED STATES PATENTS 3,025,750   3/1962   Polan et al. _____ 352—72 UX

FOREIGN PATENTS 1,222,370   8/1966   Germany _____ 352—78 C

LOUIS R. PRINCE, Primary Examiner
J. W. ROSKOS, Assistant Examiner

Disclaimer 3,669,532.—*Erwin E. Figge*, Des Plaines, Ill., *Joseph H. Lancor, Jr.*, Arcadia, Calif., and *Edward H. Lodge*, Wilmette, Ill. PROJECTOR CONTROL APPARATUS. Patent dated June 13, 1972. Disclaimer filed Oct. 25, 1972, by the assignee, *Bell & Howell Company*.

Hereby enters this disclaimer to claims 1, 2, 3 and 4 of said patent.

[*Official Gazette June 10, 1975.*]